United States Patent
Carrera et al.

(10) Patent No.: US 10,142,882 B2
(45) Date of Patent: Nov. 27, 2018

(54) NETWORK GATEWAY AND A METHOD FOR TRANSMITTING PACKETS OF A DATA STREAM

(71) Applicant: THOMSON LICENSING, Issy de Moulineaux (FR)

(72) Inventors: Marianna Carrera, Vanves (FR); Nidhi Hegde, Paris (FR); Martin May, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 238 days.

(21) Appl. No.: 14/369,343

(22) PCT Filed: Dec. 21, 2012

(86) PCT No.: PCT/EP2012/076713
§ 371 (c)(1),
(2) Date: Jun. 27, 2014

(87) PCT Pub. No.: WO2013/098255
PCT Pub. Date: Jul. 4, 2013

(65) Prior Publication Data
US 2014/0347988 A1     Nov. 27, 2014

(30) Foreign Application Priority Data
Dec. 29, 2011   (EP) .................................. 11306808

(51) Int. Cl.
*H04W 28/02*   (2009.01)
*H04L 12/66*   (2006.01)
*H04W 88/16*   (2009.01)

(52) U.S. Cl.
CPC ......... *H04W 28/0278* (2013.01); *H04L 12/66* (2013.01); *H04W 88/16* (2013.01)

(58) Field of Classification Search
CPC . H04W 28/0278; H04W 88/16; H04W 28/02; H04L 12/66
See application file for complete search history.

(56) References Cited

U.S. PATENT DOCUMENTS 6,469,991 B1   10/2002   Chuah
7,359,321 B1    4/2008   Sindhu et al.
(Continued)

FOREIGN PATENT DOCUMENTS

CN   101316153 A   12/2008
CN   101346989 A    1/2009
(Continued)

OTHER PUBLICATIONS

Wei et al., "Assessing and Improving TCP Rate Shaping over Edge Gateways", IEEE Transactions on Computers, vol. 53, No. 3, Mar. 2004, pp. 259-275.
(Continued)

*Primary Examiner* — Noel R Beharry
*Assistant Examiner* — Ruihua Zhang
(74) *Attorney, Agent, or Firm* — Tutunjian & Bitetto, P.C.

(57) ABSTRACT

A network gateway comprises a buffer and a transmission module that is configured to transmit packets of a data stream from a source device to a user device via a network medium. The packets of the data stream are received from the source device by an uplink connection between the source device and the gateway, the packets are temporarily stored in the buffer and the packets are transmitted from the buffer to the user device by a downlink connection between the user device and the gateway, such that the downlink connection depends on the uplink connection. Furthermore, the network gateway comprises a protection module that is configured to provide a protection of the uplink connection, wherein access to the network medium is reserved for the
(Continued)

packets of the data stream of the uplink connection. Finally the network gateway comprises a control module that is configured to monitor the buffer and to send an instruction to the protection module to reduce the protection of the uplink connection if a buffer overflow is detected.

15 Claims, 2 Drawing Sheets

(56) References Cited

U.S. PATENT DOCUMENTS

| | | | |
|---|---|---|---|
| 7,388,835 | B1 | 6/2008 | Zhihui et al. |
| 2005/0002364 | A1 | 1/2005 | Ozer et al. |
| 2006/0126507 | A1 | 6/2006 | Nakayasu |
| 2006/0271988 | A1* | 11/2006 | Chapman ............... H04H 20/78 725/111 |
| 2007/0133405 | A1 | 6/2007 | Bowra et al. |
| 2008/0225953 | A1 | 9/2008 | Ratakonda et al. |
| 2008/0298269 | A1 | 12/2008 | Stephan et al. |
| 2009/0028135 | A1 | 1/2009 | Mantripraga |
| 2010/0312828 | A1* | 12/2010 | Besserglick .......... H04L 65/602 709/203 |
| 2011/0225311 | A1* | 9/2011 | Liu ...................... H04L 45/125 709/231 |
| 2011/0225315 | A1* | 9/2011 | Wexler ............... H04L 65/4076 709/231 |

FOREIGN PATENT DOCUMENTS

| | | |
|---|---|---|
| CN | 101552722 | 10/2009 |
| EP | 1175051 | 1/2002 |
| JP | 2009246630 | 10/2009 |
| JP | 5054377 | 10/2012 |
| WO | WO1997010656 | 3/1997 |

OTHER PUBLICATIONS

Choi et al., "Rate-Control and Queueing of Backhaul Downstream Traffic for Mobile Wireless Systems", Wireless Personal Communications, vol. 60, No. 1, Mar. 3, 2011, pp. 125-143.
Morikawa et al., "A Study of Feedback Rate Control of Video Stream in Best-effort Mobile Packet Network", Transactions of the Information Processing Society of Japan, vol. 43, No. 12, Dec. 2002, pp. 3828-3837. English Abstract.
Girod et al., "Advances in channel-adaptive video streaming", IEEE International Conference on Image Processing (ICIP) 2002, vol. 1, Sep. 2002, pp. 1-4.
Ahmed et al., "Online Estimation of RF Interference", ACM Conference NEXT 2008, Madrid, Spain, Dec. 10, 2008, pp. 1-12.
Cai et al., "MAC layer QoS Management for Streaming Rate-Adaptive VBR Video over IEEE 802.11e HCCA WLANs", Advances in Multimedia, vol. 2007, Article ID 94040, Jun. 2007, pp. 1-11.
Casado et al., "Ethane Taking Control of the Enterprise", SIGCOMM 2007, Kyoto, Japan, Aug. 27, 2007, pp. 1-12.
Cicconetti et al., "An Efficient Cross Layer Scheduler for multimedia traffic in wireless local area networks with IEEE 802.11e HCCA", Mobile and Computing and Communications Review, vol. 11, No. 3, 2007, pp. 11-46.
Gkantsidis et al., "Traffic Management and Resource Allocation in small wired/wireless networks", ACM Conference NEXT 2009, Dec. 1, 2009, Rome, Italy, pp. 1-12.
IEEE Computer Society Standard 802 Part 11: "Wireless LAN Medium Access Control (MAC) and Physical Layer (PHY) Specifications", IEEE Standards, Jun. 12, 2007, pp. 1-1232.
Ismail, U., "Virtual PCF Improving VoIP over WLAN performance with legacy clients", Master's Thesis, University of Waterloo, Ontario, Canada, Jun. 2009, pp. 1-79.
Kohler, E., "The Click Modular Router", PHD Thesis, Massachusetts Institute of Technology, Feb. 2001, pp. 1-127.
Korakis et al., "Providing Quality of Service Guarantees in wireless LANs compliant with 802.11e", Computer Networks, vol. 47, Feb. 2005, pp. 239-255.
Koutsonikolas et al., "TDM MAC Protocol Design and Implementation for Wireless Mesh Networks", ACM Conference NEXT 2008, Madrid, Spain, Dec. 10, 2008, pp. 1-12.
Martell, "Certification Shelved for Voice QoS over Wireless", http://www.networkcomputing.com, May 24, 2007, pp. 1-2.
Narbutt et al., "Experimental Tuning of AIFSN and CWmin Parameters to Prioritize Voice over Data Transmission in 802.11e WLAN Networks", International Wireless Communications & Mobile Computing Conference, Honolulu, Hawaii, USA, Aug. 12, 2007, pp. 140-145.
Van Der Schaar et al., "Optimized Scalable Video Streaming Over IEEE 802.11 a/e HCCA Wireless Networks under Delay Constraints", IEEE Transactions on Mobile Computing, vol. 5, No. 6, Jun. 2006, pp. 755-768.
Yan et al., "Tesseract: A 4D Network Control Plane", Proceedings of 2007 4th USENIX Symposium on Networked Systems Design & Implementation, 2007, pp. 369-382.
Heusse et al., "Performance Anomaly of 802.11b", 22nd Annual Joint Conference of the IEEE Computer and Communications Societies (IEEE InfoComm 2003), San Francisco, California, USA, Mar. 30, 2003, vol. 2, pp. 836-843.
Shrivastava et al., "CENTAUR: Realizing the Full Potential of Centralized WLANs Through a Hybrid Data Path", MobiCom 2009, Beijing, China, Sep. 20, 2009, pp. 1-12.
CN Office Action issued in Chinese Application No. 2012800650649 dated Jul. 19, 2016, 8 pages.

* cited by examiner

ND A METHOD
NETWORK GATEWAY AND A METHOD FOR TRANSMITTING PACKETS OF A DATA STREAM

This application claims the benefit, under 35 U.S.C. § 365 of International Application PCT/EP2012/076713, filed Dec. 21, 2012, which was published in accordance with PCT Article 21(2) on Jul. 4, 2013 in English and which claims the benefit of European patent application No. 11306808.4, filed Dec. 29, 2011.

The invention relates to a network gateway and a method for transmitting packets of a data stream.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

As the access point at the home gateway is fast evolving into a central point for all communications to and within the home, including media streams, rate assurance for such streaming connections becomes a concern.

For example, the issue of media stream protection, in particular for video streams, was addressed in various scenarios including wireless access points. Prior work on video protection in wireless local area networks (WLANs) fall under various categories: error control techniques like improving video quality through protection from signal fading and interference, retransmission strategies like prioritization of retransmissions to recover packet losses and application-layer forward error correction and bandwidth-adaptive scalable coding. Existing methods that adapt video quality to network condition require detection of available bandwidth, including an estimation of the capacity which is complicated in WLANs, for example.

In times of congestion or heavy traffic, priority or preferential allocation to access to media streams emerges as being crucial in networks.

For instance, the document US 2007/0133405 A1 discloses a media server system comprising a content source and a playback device, both connected to a media server. The media server converts content into packetized data and transmits the data to the playback device. A congestion controller monitors a buffer status of the playback device as well as network performance. In case congestion is detected a transrater changes bit rate or data density of the content.

Moreover, a wireless base station device is disclosed in document US 2006/0126507 A1. The wireless base station device comprises baseband processors and is connected to a wireless base station controller. The wireless base station controller sends data flows to several users via the baseband processors of the wireless base station device. Each baseband processor comprises a congestion monitor that monitors a reception bandwidth usage. If congestion is detected a flow controller controls the data flow of each user.

Besides, the document U.S. Pat. No. 6,469,991 B1 relates to a medium access control protocol known as "on-demand multiple access fair queuing". If downlink/uplink buffer occupancy of a network exceeds a threshold a base station determines if this is caused by a specific remote host or by a group of remote hosts. The base station may disconnect remote hosts from the network, if network performance is low.

SUMMARY OF THE INVENTION

It is, at least, an object of the present invention to provide improved techniques for transmitting a data stream in a network and for handling congestion in the network.

This object is solved by a network gateway according to the independent claim 1 and the method for transmitting packets of a data stream according to the independent claim 8. Advantageous embodiments of the invention are subject of dependent claims. According to one aspect of the invention, a network gateway is provided, comprising
  a buffer,
  a transmission module that is configured to transmit packets of a data stream from a source device to a user device via a network medium, wherein the packets of the data stream are received from the source device by an uplink connection between the source device and the gateway, the packets are temporarily stored in the buffer and the packets are transmitted from the buffer to the user device by a downlink connection between the user device and the gateway, such that the downlink connection depends on the uplink connection,
  a protection module (also called prioritization module) that is configured to provide a protection of the uplink connection, wherein access to the network medium is reserved for the packets of the data stream of the uplink connection, and
  a control module that is configured to monitor the buffer and to send an instruction to the protection module to reduce the protection of the uplink connection if a buffer overflow is detected.

According to another aspect of the invention a method for transmitting packets of a data stream from a source device to a user device by a network gateway via a network medium is provided, the method comprising the following steps of:
  receiving the packets of the data stream from the source device by the gateway, wherein an uplink connection between the source device and the gateway is provided,
  temporarily storing the packets of the data stream in a buffer of the gateway,
  transmitting the packets of the data stream from the buffer of the gateway to the user device, wherein a downlink connection between the gateway and the user device is provided such that the downlink connection depends on the uplink connection,
  protecting the uplink connection by reserving access to the network medium for the packets of the data stream by the gateway,
  monitoring the buffer, and
  reducing the protection of the uplink connection if a buffer overflow is detected by the gateway.

The network gateway can be part of a network system, for example a home network, where a connection between the source device and the user device pass through an access point of the gateway. Preferably, the data stream is a media stream, for example a video stream or an audio stream. The source device can be a set-top box or a media center and the user device can be any kind of playback device, e.g. a television or a stereo device.

When the packets of the data stream are transmitted from the source device to the user device, the uplink connection and the downlink connection share the same channel. They are in competition for access to the network medium. In times of congestion at the gateway, packets destined on the downlink connection to the user device are queued in the buffer and may be dropped. All the while packets on the uplink connection belonging to the same data stream continue to be sent on the uplink connection from the source device. These transmissions are potentially wasted if they are dropped at the gateway.

However, with the data stream being downloaded from the source device to the user device, the connections from the source device to the gateway and from the gateway to the user device are not independent. Instead, the invention can take advantage of the dependence between the source device's uplink connection and the user device's downlink connection to realize allocation of network medium access. The dependence between the uplink connection and the downlink connection can be identified by the gateway. Hereby, a complex estimation of network capacity is not required because packet queue information readily available at the gateway is used to determine that congestion control is necessary.

Once congestion is detected by the control module, the control module can send an instruction to the protection module to reduce access of the source device to the network medium so as to avoid long queues at the buffer. Hereby, unnecessary packet losses can be avoided.

The transmission module can be configured to transmit several data streams from several source devices to several user devices, respectively. Each data stream is divided into packets. Each source device sends its packets to the gateway, wherein several uplink connections are created, where the packets are temporarily stored in virtual queues of the buffer, respectively. From each virtual queue the packets are transmitted to the respective user device by several downlink connections. For each data stream the downlink connection depends on the corresponding uplink connection. The protection module can be configured to provide protection to some or all of the uplink connections. The control module can be configured to reduce the protection of one of the several uplink connections if the corresponding virtual queue of the buffer overflows.

In a preferred embodiment, the transmission module is configured to transmit the packets of the data stream via a wireless network medium. A wireless network, e.g. a WLAN, provides a convenient way to connect the source device and/or the user device with the gateway without the need of a cable.

According to a further embodiment, the protection module is configured to send clear-to-send signals at a target rate to the source device, wherein the target rate is chosen to ensure that the packets of the data stream are received in a timely manner so that the data stream is not interrupted. By sending the clear-to-send signal to the source device, bandwidth of the wireless network medium can be reserved for the source device. The reservation is implicit. The clear-to-send signal can be provided as an unsolicited clear-to-send signal. Alternatively, the protection can be provided as transmission grants such as in the WLAN standard 802.11n. The action of choking network access by the source device can serve to avoid packet losses at the cost of increasing packet delay.

A clear-to-send signal is a signal used to silence—for a predetermined period of time—all the devices in the range of the gateway, except the source device. A clear-to-send signal can be used to reserve time for the uplink connection.

In still another preferred embodiment, the control module is configured to send an instruction to the protection module to reduce the rate at which the clear-to-send signals are sent to the source device below the target rate if a buffer overflow is detected. By reducing the rate at which the clear-to-send signals are sent, less bandwidth can be reserved for the uplink connection. Thus, more bandwidth can be available for the downlink connection and the packets stored in the buffer can be transmitted to the user device.

In a further embodiment, the control module is configured to send an instruction to the protection module to increase the rate at which the clear-to-send signals are sent to the source device up to the target rate if a buffer underflow is detected. If buffer fill is low or the buffer is even empty the protection of the uplink connection can be increased by increasing the rate of the clear-to-send signals. Once the congestion is relieved or the corresponding downlink connection of the data stream has gained preference in access, the normal protected access can be reinstated for the source device.

In still a further embodiment of the invention, the transmission module is configured to transmit the packets of the data stream at a medium access control (MAC) layer. The MAC layer controls access to the network medium. In contrast to an application layer that can only communicate with endpoints, the MAC layer can address all devices in the network, such as endpoints and/or relays. Thus, the gateway can directly control the preferences to network medium access, not relying on endpoints to adapt to congestion. Hereby, collision free transmissions between the gateway and the source device as well as the gateway and the user device can be provided.

In a preferred embodiment, a buffer overflow is detected if a number of packets in the buffer exceeds an upper buffer number and/or a size of the packets in the buffer exceeds an upper buffer size.

BRIEF DESCRIPTION OF THE FIGURES

The invention will be better understood and illustrated by means of the following embodiment and execution examples, in no way limitative, with reference to the appended figures on which.

Figure 1:
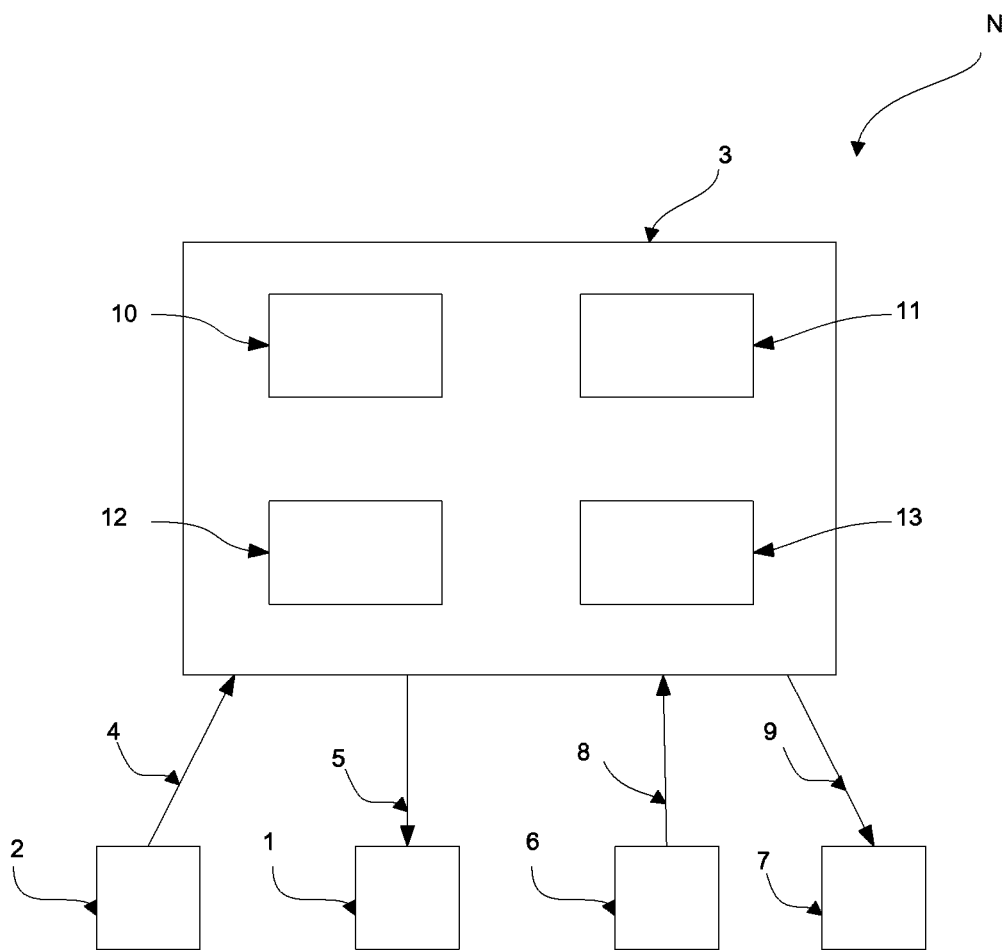
FIG. 1 depicts a wireless home network system compliant with a preferred embodiment of the present invention.

In the figures, alike reference numerals refer to alike parts, unless otherwise indicated.

DESCRIPTION OF THE PREFERRED EMBODIMENTS OF THE INVENTION

Figure 2:
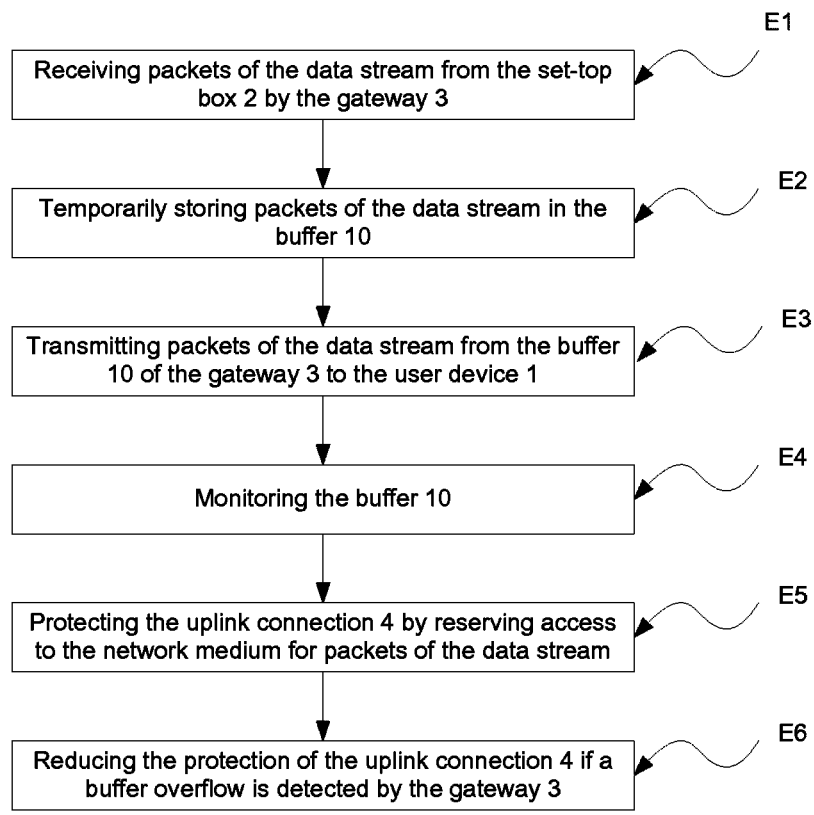
FIG. 2 is a flow chart illustrating the steps of a method for transmitting packets compliant with said preferred embodiment.

As shown in FIG. 1, a wireless home network system N illustrated in the figure is considered with the following scenario. A user device 1 is downloading a media stream from a set-top box 2. Packets of the media stream passes through (steps E1 and E3 of FIG. 2) an access point of a home gateway 3. An uplink connection 4 is provided from the set-top box 2 to the gateway 3 and a downlink connection 5 is provided from the gateway 3 to the user device 1. Further user devices 6, 7 have uplink and downlink connections 8, 9 to the gateway 3 carrying some other traffic.

In order to ensure quality of service to the media stream, a protection mechanism exists at the gateway 3 that controls access to the shared wireless medium. The gateway 3 comprises a buffer 10 with a virtual queue for each destination of the downlink connections 5,9.

While the uplink connection 4 and the downlink connection 5 carry the same media stream, they are in practice decoupled at the medium access control (MAC) layer. In times of congestion, the virtual queue of the buffer 10 at the gateway 3 holding packets for the downlink connection 5 builds up (step E2 of FIG. 2), causing both packet losses at the gateway 3, and perhaps delay at the destination, the user device 1.

A control module 11 of the gateway 3 monitors (step E4 of FIG. 2) the buffer 10 and tracks packet queues.

At the initiation of the media stream, a transmission module 12 of the gateway 3 establishes that the uplink connection 4 and the downlink connection 5 are dependent, more specifically connection 5 being dependent on uplink connection 4. The transmission module 12 informs the control module 11 to track the virtual queue in the buffer 10 corresponding to the packets of downlink connection 5.

The control module 11 is parametrized with a parameter $\beta$, the queue occupancy that triggers (step E5 of FIG. 2) the media protection adaptation and some hysteresis value $\varepsilon$.

When the virtual queue of the buffer 10 corresponding to the downlink connection 5 reaches an occupancy of $(\beta+\varepsilon)\%$, the control module 11 informs a protection module 13 of the gateway 3 of perceived congestion. The protection module 13 enters the coordinated protection mode.

In this mode, the protection module 13 adjusts the access preference given to the set-top box 2 so as to reduce (step E6 of FIG. 2) the protection of the uplink connection 4. For example, if the protection mechanism is loosely based on IEEE 802.11e, it may adjust access parameters such as backoff window sizes (which is a crucial part of the IEEE 802.11 WLAN protocol, since the size of a backoff window has an impact on throughout). Alternatively, a rate at which clear-to-send signals are sent to the set-top box by the protection module 13 can be reduced.

This results in reducing the transmission rate of the set-top box 2 and thus a reduced arrival rate of packets from the uplink connection 4 packets at the gateway 3. Reducing access preference of the set-top box 2 will result in more opportunities for the gateway 3 to transmit the packets to the downlink connection 5.

As the virtual queue of the buffer 10 corresponding to the downlink connection 5 decreases to below $(\beta-\varepsilon)\%$ occupancy, the control module 11 informs the protection module 13 that the congestion period has ended. The protection module 13 then switches to normal protection mode.

As the occupancy of the virtual queue of the buffer 10 corresponding to the downlink connection 5 varies, the above steps are repeated.

Hereby, a parameter to control the choking action is provided, that allows a fine-tuning of the point of operation along the curve of tradeoff between packet loss and delay. The present invention having been described in its preferred embodiment, it is clear that it is susceptible to numerous modifications and embodiments within the ability of those skilled in the art.

In the claims hereof, any element expressed as a means (or unit) for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the application program (or a combination thereof) that is executed via the operating system.

The invention claimed is:

1. A network gateway, comprising
    a buffer,
    a transmission module that is configured to transmit packets of a data stream from a source device to a user device via a network medium, wherein the packets of the data stream are received from the source device by an uplink connection between the source device and the gateway, the packets are temporarily stored in the buffer and the packets are transmitted from the buffer to the user device by a downlink connection between the user device and the gateway, such that the downlink connection depends on the uplink connection, the downlink connection and the uplink connection sharing said network medium;
    a protection module configured to provide a protection of the uplink connection reserving access to the network medium for the packets of the data stream of the uplink connection of said network medium, and
    a control module that is configured to monitor the buffer and to send an instruction to the protection module to reduce the protection of the uplink connection if a buffer overflow is detected, so as to reduce access of the source device to the network medium.

2. The gateway according to claim 1, wherein the transmission module is configured to transmit the packets of the data stream via a wireless network medium.

3. The gateway according to claim 2, wherein the protection module is configured to send clear-to-send signals at a target rate to the source device, wherein the target rate is chosen to ensure that the packets of the data stream are received in a timely manner so that the data stream is not interrupted.

4. The gateway according to claim 3, wherein the control module is configured to send an instruction to the protection module to reduce the rate at which the clear-to-send signals are sent to the source device below the target rate if a buffer overflow is detected.

5. The gateway according to claim 4, wherein the control module is configured to send an instruction to the protection module to increase the rate at which the clear-to-send signals are sent to the source device up to the target rate if a buffer underflow is detected.

6. The gateway according to claim 1, wherein the transmission module is configured to transmit the packets of the data stream at a medium access control layer.

7. The gateway according to claim 1, wherein a buffer overflow is detected if a number of packets in the buffer exceeds an upper buffer number and/or a size of the packets in the buffer exceeds an upper buffer size.

8. A method for transmitting packets of a data stream from a source device to a user device by a network gateway via a network medium, the method comprising:

receiving the packets of the data stream from the source device by the gateway, wherein an uplink connection between the source device and the gateway is provided, temporarily storing the packets of the data stream in a buffer of the gateway, transmitting the packets of the data stream from the buffer of the gateway to the user device, wherein a downlink connection between the gateway and the user device is provided such that the downlink connection depends on the uplink connection, the downlink connection and the uplink connection sharing said network medium;

protecting the uplink connection of said network medium by reserving access to the network medium for the packets of the data stream by the gateway, monitoring the buffer, and reducing the protection of the uplink connection if a buffer overflow is detected by the gateway, so as to reduce access of the source device to the network medium.

9. The method according to claim 8, wherein the packets of the data stream are transmitted via a wireless network medium.

10. The method according to claim 9, further comprising sending clear-to-send signals at a target rate to the to the source device by the gateway, wherein the target rate is chosen to ensure that the packets of the data stream are received in a timely manner so that the data stream is not interrupted.

11. The method according to claim 10, further comprising reducing the rate at which the clear-to-send signals are sent below the target rate if a buffer overflow is detected.

12. The according to claim 11, further comprising increasing the rate at which the clear-to-send signals are sent up to the target rate if a buffer underflow is detected by the gateway.

13. The method according to claim 8, wherein receiving and/or transmitting the packets of the data stream is performed by the gateway at a medium access control layer.

14. The method according to claim 8, further comprising detecting a buffer overflow if a number of packets in the buffer exceeds an upper buffer number and/or a size of the packets in the buffer exceeds an upper buffer size.

15. A network gateway for transmitting packets of a data stream from a source device to a user device via a network medium, the network gateway comprising at least one memory and at least one processing circuitry configured to perform:

receiving the packets of the data stream from the source device by the gateway, wherein an uplink connection between the source device and the gateway is provided, temporarily storing the packets of the data stream in a buffer of the gateway, transmitting the packets of the data stream from the buffer of the gateway to the user device, wherein a downlink connection between the gateway and the user device is provided such that the downlink connection depends on the uplink connection, the downlink connection and the uplink connection sharing said network medium, protecting the uplink connection of said network medium by reserving access to the network medium for the packets of the data stream by the gateway, monitoring the buffer, and reducing the protection of the uplink connection if a buffer overflow is detected by the gateway, so as to reduce access of the source device to the network medium.

* * * * *